3,132,934
FERRIC CHELATES OF 1-HYROXY-2:6-DI-[(N,N¹-BIS-CARBOXY-ETHYL OR METHYL)-AMINO-METHYL] BENZENES
Richard Sallmann and Rudolf Anliker, Binningen, Switzerland, assignors to Ciba Limited, Basel, Switzerland
No Drawing. Filed July 29, 1959, Ser. No. 830,190
Claims priority, application Switzerland Aug. 8, 1958
4 Claims. (Cl. 71—1)

This invention relates to iron complex salts, to the preparation of such salts and to compositions containing such salts and useful as plant protection agents.

According to a first feature of the present invention there are provided water-soluble iron complex salts of substituted iminodicarboxylic acids of the general Formula I:

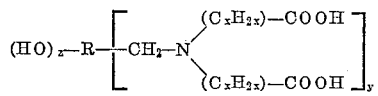

in which R represents an aryl radical or substituted aryl radical, $x$ an integer not higher than 2, $y$ an integer not higher than 4 and $z$ an integer not higher than 3.

According to a further feature of the invention the aforesaid iron complex salts are produced by reacting together in any desired sequence iminodicarboxylic acids of general Formula I, iron salts and compounds which provide salt-forming monovalent or polyvalent cations. Preferably, iron salts are reacted with the iminodicarboxylic acids of general Formula I in aqueous solution and in the presence of salt-forming cations, more especially alkali, metal alkaline earth metal or ammonium ions. If desired, the resulting aqueous solution may be evaporated to dryness. The salts, more especially the alkali metal alkaline earth or ammonium salts, or ferri-complex acids are thus obtained in the form of solutions or dry preparations. By reduction of the pH value of the complex iron salt solutions, the free iron complex acids can be precipitated therefrom.

Alternatively the aforesaid iron complex salts are provided by treatment of normal iron salts of iminocarboxylic acids of general Formula I with alkali metal or ammonium salts. In a further alternative, alkali metal or ammonium salts of acids of general Formula I are treated with iron salts.

The new ferri-complex compounds are highly alkali-resistant. Thus, even equivalent quantities of complex-forming iminodicarboxylic acid and iron form stable solutions under highly alkaline conditions. This is very surprising because, in the case of other complex compounds of iron, either flocculation takes place immediately in alkaline medium, or a large excess of the complex-forming agent is necessary to keep the iron in solution.

The iminodicarboxylic acids from which the new ferri-complex compounds are derived are described in U.S. Patent No. 2,763,680 granted September 18, 1956 to Richard Sallmann. Thus, they can be obtained by reacting together formaldehyde, or a compound yielding formaldehyde, an iminodicarboxylic acid of the general Formula II.

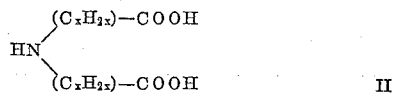

wherein $x$ represents 1 or 2, or a salt of such an iminodicarboxylic acid, and an aromatic compound of the general formula $R—(OH)_z$, in which $z$ represents an integer not higher than 3, in which the hydroxyl groups are of the phenolic character and in which a hydrogen atom is present in at least one o-position, or in the p-position to at least one hydroxyl group.

The aromatic compounds of the general formula $R(OH)_z$ from which the iminodicarboxylic acids of general Formula I can be derived are phenols or phenollike compounds. They may comprise one or more phenolic hydroxyl groups and may be substituted or un-substituted, but they must contain a hydrogen atom in at least one o-position or in the p-position of at least one phenolic hydroxyl group. Suitable compounds are phenol, o-, m-, or p-cresol, more highly alkylated phenols, such as 4-butyl phenol, 4-dodecylphenol and 4-octadecyl-phenol, chlorophenols such as o- or p-chlorophenol or 2,4-dichlorophenol, p-nitrophenol, p-acetylaminophenol, salicyclic acid, p-hydroxybenzoic acid, phenolsulfonic acids such as p-phenol sulfonic acid, or polynuclear hydroxyl compounds, such as β-naphthol, 2-hydroxydiphenyl, 4-hydroxydiphenyl, 4-hydroxydiphenyl ether, 2-cyclohexylphenol and 4-benzylphenol.

Suitable phenolic compounds comprising more than one phenolic hydroxyl group, are brenzcatechin, resorcinol, hydroquinone and pyrogallol.

Suitable iminodicarboxylic acids of general Formula II, from which the substituted iminodicarboxylic acids of general Formula I are derived, are iminodipropionic acids of the formulae

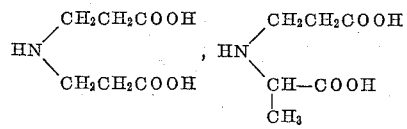

and

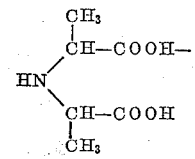

III and preferably iminodiacetic acid of the formula:

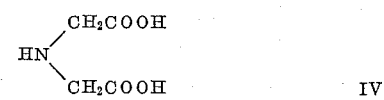

IV

In the preparation of the complex iron salts, the alkali metal or ammonium salts of iminodicarboxylic acids of general Formula I may with advantage be employed as starting materials. However, instead of employing preformed salts, the salts may be formed in situ by reacting the free iminodicarboxylic acid of general Formula I with an alkali metal or alkaline earth metal hydroxide or carbonate or ammonia, preferably in stoichiometric quantity. The acid formed on addition of the iron salt may conveniently be neutralized by addition of alkali metal or alkaline earth hydroxide or carbonate or ammonia, the quantity added depending upon whether the end product is required to have a neutral, alkaline or weakly acid reaction.

As iron salts for the preparation of the present complex compounds, there may be employed any water-soluble salts of divalent or trivalent iron, such for example as ferrous sulfate, ferric ammonium sulfate or ferric chloride. Ferrous salts employed as starting materials may be oxidized to form ferric salts in the aqueous reaction solution by addition of any substance known per se to be capable of converting ferrous salts into ferric salts. Preferably, hydrogen peroxide is employed. By evaporation of the reaction solution, which is preferably effected under reduced pressure, the complex iron salts are obtained in the form of dry preparations which are generally readily water-soluble, but not hygroscopic.

Particularly advantageous properties are possessed by iron complex salts, more especially the $Fe^{III}$ complex salts of substituted iminodiacetic acids of the general formula:

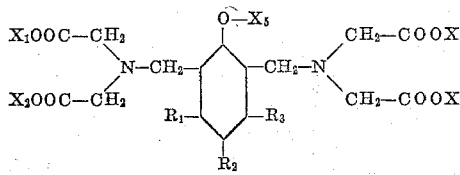

in which $R_1$, $R_2$ and $R_3$ represent hydrogen atoms or inert substituents, e.g. alkyl, alkoxy, carboxyl, hydroxyl, sulfonic acid, nitro, amino, acylamino and cyano groups or halogen atoms, and $X_1$, $X_2$, $X_3$, $X_4$ and $X_5$ are hydrogen atoms or salt-forming cations.

The iron complex salts of the present invention are valuable plant protection agents. They may be employed to treat iron deficiency diseases, because the complex salts are readily absorbed by plants and are not substantially absorbed by the constituents of the soil. A particular advantage of the iron complex salts of the present invention is their resistance to alkali.

Iron chlorosis, which is a deficiency illness of many useful and decorative plants, may be due either to actual lack of iron in the soil or to high alkalinity of the soil (pH values above 7) such as occurs in many highly calcareous soils.

In the latter case, the known methods of combatting iron chlorosis with iron complex compounds, such for example as the ferri-complexes of ethylenediamine tetracetic acid or of diethylenetriamine pentacetic acid, have given unsatisfactory results, because such complex iron compounds, when applied to highly alkaline soils, are either decomposed into iron hydroxide (which is not resorbable by the plant) and the free complex-forming agent, or are irreversibly absorbed by the clay.

In contrast the iron complex salts of the present invention are of excellent value for combatting or preventing iron chlorosis in useful and decorative plants growing on alkaline or highly argillaceous soil.

According to a further feature of the present invention, therefore, there are provided plant protection preparations comprising water-soluble iron complex salts of acids of general Formula I together with a carrier or diluent substance.

In the production of such compositions the iron complex salt may be mixed with inert solid carrier substances such as kaolin or talcum or with solid fertiliser material and used by sprinkling the compositions among the plants to be treated. Alternatively, and for preference, the compositions consist of aqueous solutions of the iron complex salts and are applied by sprinkling the plants with such solution. Instead of employing solutions of the isolated iron complex salts, the solutions obtained in the preparation of the iron complex salts may be employed. When solutions are employed, fertilisers and/or pesticides and/or weedkillers may be included in such solutions or as dispersions therein.

In the following examples the temperatures are given in degrees centigrade.

EXAMPLE 1

8.4 grams (0.02 mol) of 1-hydroxy-2,6-di-[(N,N'-bis-carboxymethyl)-aminomethyl]-4-chlorobenzene of the formula

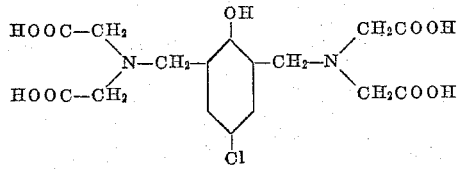

obtained by mixing p-chlorophenol, formaldehyde and the sodium salt of iminodiacetic acid in alkaline solution and acidifying the mixture with mineral acid, are stirred with 100 ml. of water. 4.0 grams of ferric sulfate (1 atom equivalent) are then added with stirring and slight heating, followed by 5.4 grams of sodium carbonate, and the temperature is raised to 80°. A reddish-brown solution of the complex salt is obtained. After evaporation in vacuo at 60°, there are obtained 13.4 grams of the iron complex salt as a dark brown powder which is readily soluble in water and non-hygroscopic.

1.5 grams of the said iron complex salt are dissolved in 30 ml. of water with slight heating. 7 grams by volume of normal caustic soda solution are added thereto, so that a pH value of 12 is obtained. The clear solution is stable even after standing for several days and shows no precipitate after heating at 60° for 24 hours.

EXAMPLE 2

8.4 grams of 1-hydroxy-2,6-di-[(N,N'-bis-carboxymethyl)-aminomethyl]-4-chlorobenzene (0.02 mol), obtained from p-chlorophenol, formaldehyde and the sodium salt of imino-di-acetic acid are suspended in 80 ml. of water. There are added thereto with stirring, first a solution of 5.6 grams of ferrous sulfate, crystallized from 30 ml. of water, and then 1.4 grams of hydrogen peroxide (28%). After brief heating, the temperature is raised to 50–60° and the product is neutralized with 4.5 grams of sodium carbonate.

A reddish-brown solution is obtained.

After evaporation in vacuo, there remain 13.5 grams of the complex salt as a blackish-brown powder.

The stability of an alkaline aqueous solution (pH value 12) of the obtained complex salt is as good as that of the alkaline solution, described in Example 1, of an iron complex salt prepared by the use of ferric sulfate.

EXAMPLE 3

I. *Preparation of Complex-Formers*

(a) 32.1 grams of para-chlorophenol (0.25 mol) are dissolved in 60 ml. of water which contains 10 grams of sodium hydroxide (0.25 mol). 80.5 grams of $\beta:\beta'$-iminodipropionic acid of M.P. 151–153° C. (0.5 mol) in 260 grams of sodium hydroxide solution of 10% strength (0.65 mol) are added to the clear solution. 46 grams of an aqueous formaldehyde solution of 37% strength are added dropwise at 40° C. with stirring, and the whole is then maintained at 75° C. for 4 hours. 91 grams of hydrochloric acid of 36% strength (0.9 mol) are added dropwise to the ice-cold clear solution, 1-hydroxy-2,6-di[(N:N'-bis-carboxyethyl) - amino - methyl]-4-chlorobenzene precipitating as a resinous mass. The latter is decanted off from the supernatant solution and dried. The preparation is dissolved in 150 ml. of methanol and filtered off from undissolved NaCl.

After evaporating the methanol, 85 grams of the complex-former are obtained which melts above 96° C. with decomposition.

N: Calculated 5.90%. Found 5.96%

(b) In an analogous manner and using corresponding molar quantities of $\beta:\beta'$-iminodipropionic acid, para-cresol and formaldehyde there is obtained 1-hydroxy-2:6-di-[(N:N'-bis-carboxyethyl)-amino-methyl] - 4 - methylbenzene in a yield of 63% calculated on imino-propionic acid which, after being precipitated from ethanol, melts at 114–120° C. with decomposition.

N: Calculated 6.16%. Found 6.0%

(c) From para-tertiary amylphenol, iminodiacetic acid and formaldehyde and using corresponding molar proportions and the same reaction conditions there is obtained 1-hydroxy-2:6-di-[(N:N'-carboxymethyl)-amino-methyl]-4-tertiary amylbenzene in 82% yield, calculated on iminodiacetic acid. The pale yellow compound melts at 155–160° C. with decomposition.

N: Calculated 6.16%. Found 5.4%

(d) To a suspension of 21.25 grams of 4-phenyl-phenol (0.125 mol), 40.25 grams of β:β'-imino-dipropionic acid (0.25 mol) in 50 ml. of ethanol and 300 grams of sodium hydroxide solution of 6% strength (0.45 mol) there are added dropwise 23 grams of a formaldehyde solution of 37% strength at 50° C. The mixture is then maintained for 6 hours at 80° C., a clear solution being formed. By adding 45.5 grams of hydrochloric acid of 36% strength (0.45 mol) dropwise at 0° C. a resinous mass precipitates which is separated from the aqueous solution and dried in vacuo.

The 1-hydroxy-2:6-di[(N:N' - bis - carboxyethyl)-aminomethyl]-4-phenylbenzene which is recrystallized from alcohol melts above 120° C. with decomposition and is obtained in the form of a white powder in a yield of 52%.

N: Calculated 3.3%. Found 3.52%

(e) In an analogous manner starting from corresponding molar quantities of 4-phenyl-phenol, iminodiacetic acid and formaldehyde, there is obtained 1-hydroxy-2:6-di - [(N:N' - bis - carboxymethyl) - aminomethyl] - 4-phenyl-benzene in a yield of 78% calculated on iminodiacetic acid. The preparation reprecipitated from ethanol melts at 163° C. with decomposition.

N: Calculated 6.08%. Found 5.6%

(f) 31 grams of para-methoxy-phenol (0.25 mol) are placed together with 66.5 grams of imino-diacetic acid (0.5 mol) and 257 grams of sodium hydroxide solution of 14% strength (0.65 mol) in a flask fitted with stirring means and reflux condenser. 46 grams of formaldehyde of 37% strength are added dropwise to the clear solution at 40° C. The whole is then stirred for 4 hours at 70-75° C. 91 grams of hydrochloric acid of 36% strength are added at 0° C. The clear pale brown solution is evaporated to dryness in vacuo. The resinous residue is taken up in 100 ml. of methanol, filtered off from the sodium chloride which has separated off quantitatively, and the solvent is evaporated. 1-hydroxy-2:6-di - [(N:N'-carboxymethyl) - aminomethyl] - 4 - methoxy-benzene remains as a white powder which, when recrystallized from methanol, melts at 160° C. with decomposition. Yield: 34%.

N: Calculated 6.76%. Found 6.48%

II. *Preparation of Iron Complex Salts*

94.9 grams (0.2 mol) of 1-hydroxy-2:6-di-[(N:N'-bis-carboxyethyl)-aminomethyl]-4 - chlorobenzene (a) are suspended in 1 liter of water. 39.9 grams (0.4 mol) of ferric sulfate are added at 40° C. with stirring and then 42.4 grams of anhydrous sodium carbonate (0.4 mol), the temperature being raised to and maintained at 80° C. until dissolution is complete. The clear red-brown solution of the sodium salt of the ferri-complex compound is evaporated to dryness at 90° C. in vacuo, 152.1 grams of a brown-red powder being obtained.

The pH value of $10^{-2}$ molar solution of the iron complex salt described is adjusted to 12 by the addition of the necessary quantity of N-sodium hydroxide solution. Even after being allowed to stand for 24 hours at 30° C. all the iron present remains dissolved.

If, in the above example, equivalent quantities of other complex formers are used, stable ferri-complex compounds are also obtained in the alkaline range. There are obtained in quantitative yield the sodium salt of the ferri-complexes of the following compounds as red-brown to red-violet, non-hygroscopic powder which can be readily dissolved in water:

1-hydroxy-2:6-di-[(N:N'-bis-carboxy-ethyl)-amino-methyl]-4-methylbenzene (b), 1-hydroxy-2:6-di-[(N:N'-bis-carboxymethyl)-amino-methyl]-4-tertiary amylbenzene (c),
1-hydroxy-2:6-di-[(N:N'-bis-carboxyethyl)amino-methyl]-4-phenylbenzene (d),
1-hydroxy-2:6-di-[(N:N'-bis-carboxymethyl)-amino-methyl]-4-phenylbenzene (e),
1-hydroxy-2:6-di-[(N:N'-bis-carboxymethyl)-amino-methyl]-4-methoxybenzene (f).

The $10^{-2}$ molar solutions of the sodium salts of the ferri-complexes of the above compounds, whose pH value is adjusted to 12 by the addition of the necessary quantity of N-sodium hydroxide solution, do not precipitate any ferric hydroxide after standing for 24 hours at 30° C.

EXAMPLE 4

83.6 grams of 1-hydroxy-2:6-di-[(N:N'-bis-carboxymethyl)-aminomethyl]-4-chlorobenzene (0.2 mol) are dissolved in 3 liters of water. 0.2 mol of freshly precipitated ferric hydroxide is added and digested in a water bath until the ferric hydroxide is completely dissolved. The resulting clear, dark violet solution can be evaporated to obtain the acid ferri-complex compound.

If the solution of the acid ferri-complex compound is reacted with 0.1 mol of sodium carbonate at 40° C. and then maintained for 1 hour at 80° C. and finally evaporated to dryness, the practically pure monosodium salt of the ferri-complex compound of 1-hydroxy-2:6-di-[(N:N' - bis-carboxymethyl)-aminomethyl]-4-chlorobenzene is obtained as a dark brown non-hygroscopic powder.

EXAMPLE 5

488 grams of 1-hydroxy-2:6-di-[(N:N'-bis-carboxymethyl)-aminomethyl]-4-chlorobenzene (1.16 mols) are suspended in 2.5 liters of water and 232 grams of ferric sulfate (0.58 mol) are added with stirring at 40° C. 93.6 grams of magnesium oxide (2.32 mols) are added in portions and the mixture is maintained at 80° C. until a clear, dark violet solution is formed. The solution is evaporated to dryness at 70° C. in vacuo. The magnesium salt of the ferri-complex compound is a red brown powder which is readily soluble in water.

EXAMPLE 6

For the treatment of citrus trees growing on sandy-clay soil, and suffering from iron chlorosis, 400 grams per trunk of a mixture of equal parts of sand and of the sodium salt of the ferri-complex compound of 1-hydroxy-2,6 - di - [(N:N' - bis-carboxymethyl) - aminomethyl]-4-chlorobenzene, as described in Example 1, are uniformly distributed in the soil under the trees and washed in with water. After about 1 month, the trees recover from the iron deficiency, so that the yellow leaf regions disappear and new dark green shoots grow.

EXAMPLE 7

Chlorotic vines growing on a soil deficient in iron and magnesium are sprayed with a liquid containing 0.2% of the magnesium salt of the ferri-complex compound of 1-hydroxy - 2:6 - di - [(N:N'-bis-carboxymethyl)-amino-methyl]-4-chlorobenzene described in Example 5 and 2% of magnesium sulfate heptahydrate. In the course of a few weeks the new shoots of the treated plants are free from chlorosis.

What is claimed is:
1. A ferric chelate of a substituted iminodiacetic acid of the formula

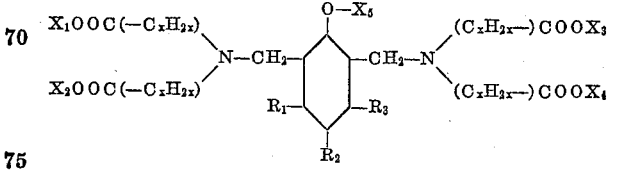

wherein $x$ is an integer of at the most 2; each of $R_1$, $R_2$ and $R_3$ is a member selected from the class consisting of hydrogen, halogen, nitro, alkyl having at the most 18 carbon atoms, methoxy, and phenyl; and each of $X_1$, $X_2$, $X_3$, $X_4$ and $X_5$ is a salt-forming cation selected from the group consisting of alkali metal ions, ammonium, and, two of $X_1$, $X_2$, $X_3$, $X_4$ and $X_5$ taken together, alkaline earth metal ion.

2. A ferric chelate of the iminodiacetic acid of the formula

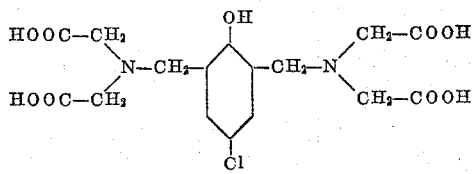

3. The sodium salt of the ferric chelate of 1-hydroxy-2,6-di[(N,N¹-bis-carboxymethyl)-aminomethyl]-4-chlorobenzene.

4. A composition for use in combatting and preventing iron deficiency in plants comprising a water-soluble ferric chelate of a substituted iminodicarboxylic acid of the general formula

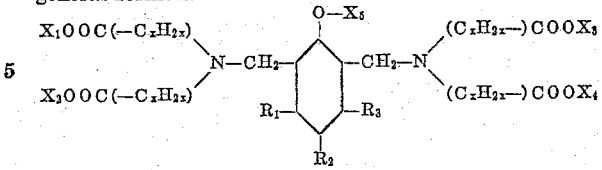

wherein $x$ is an integer of at the most 2; each of $R_1$, $R_2$ and $R_3$ is a member selected from the class consisting of hydrogen, halogen, nitro, alkyl having at the most 18 carbon atoms, methoxy, and phenyl; and each of $X_1$, $X_2$, $X_3$, $X_4$ and $X_5$ is a salt-forming cation selected from the group consisting of alkali metal ions, ammonium, and, two of $X_1$, $X_2$, $X_3$ and $X_5$ taken together, alkaline earth metal ion, together with a horticulture carrier which is inert to the ferric chelate.

References Cited in the file of this patent
UNITED STATES PATENTS

| | | |
|---|---|---|
| 2,763,680 | Sallmann | Sept. 18, 1956 |
| 2,906,762 | Knell et al. | Sept. 29, 1959 |
| 2,921,847 | Knell et al. | Jan. 19, 1960 |